Figure 3:
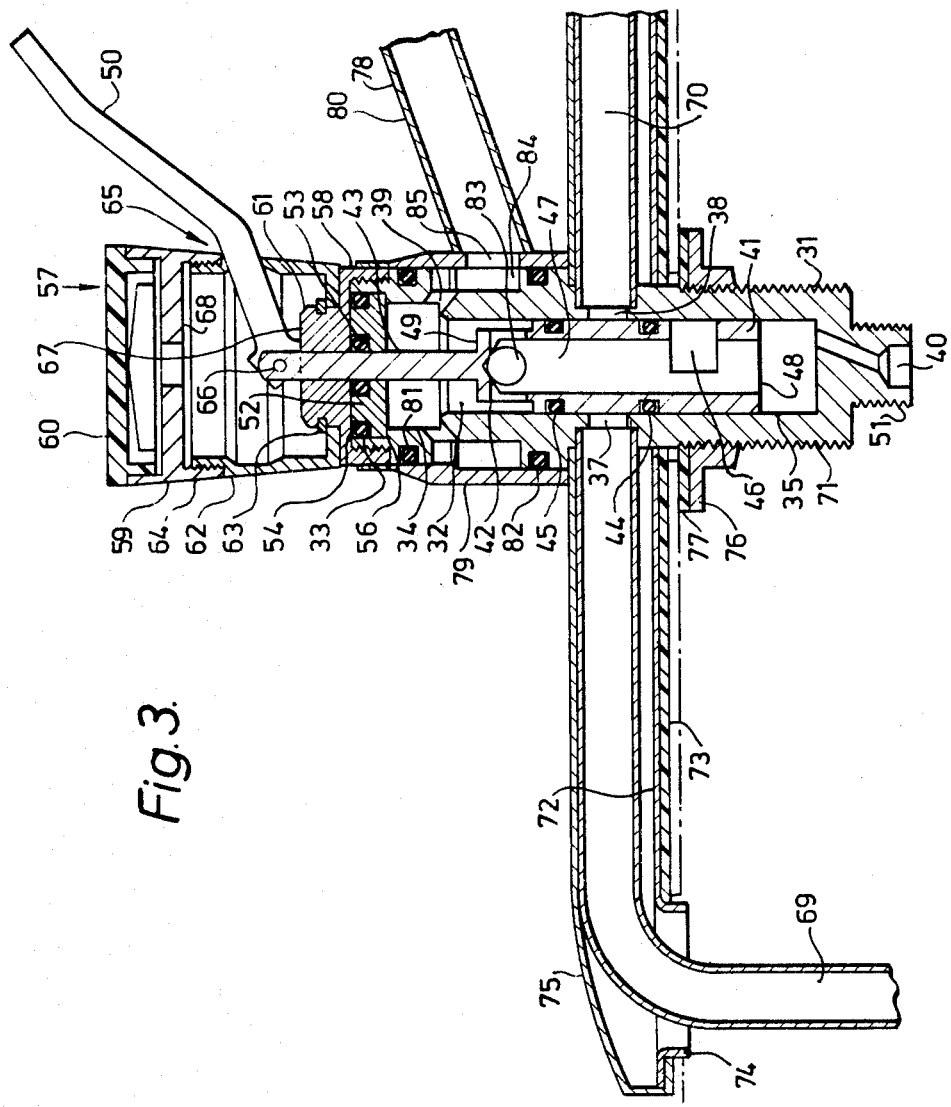

United States Patent [19]

Watts

[11] 4,050,475
[45] Sept. 27, 1977

[54] MIXING FAUCET

[75] Inventor: Horace Watts, Pinner, England

[73] Assignee: H. & D. E. Watts Limited, England

[21] Appl. No.: 605,919

[22] Filed: Aug. 19, 1975

[30] Foreign Application Priority Data

Sept. 13, 1974 United Kingdom .............. 39957/74

[51] Int. Cl.² ............................................ F16K 11/07
[52] U.S. Cl. ............................. 137/625.17; 251/284
[58] Field of Search ................ 137/625.17; 251/284, 251/286, 288

[56] References Cited

U.S. PATENT DOCUMENTS

| | | | |
|---|---|---|---|
| 2,845,948 | 8/1958 | Parker | 137/625.17 |
| 2,949,933 | 8/1960 | Moen | 137/625.17 |
| 3,202,181 | 8/1965 | West | 137/625.17 |
| 3,358,714 | 12/1967 | Moen | 137/625.17 |
| 3,387,631 | 6/1968 | Pecis | 137/625.17 |
| 3,459,223 | 8/1969 | Katva | 137/625.17 |
| 3,893,481 | 7/1975 | Watts | 137/625.17 |

*Primary Examiner*—William R. Cline
*Attorney, Agent, or Firm*—Dorfman, Herrell and Skillman

[57] ABSTRACT

The invention provides a hot and cold water mixing and flow control faucet of the hydraulically unbalanced piston type. A control stem of the piston passes through a seal of a self-energizing nature for connection to an actuating member operative to rotate and reciprocate the piston. The piston is substantially pressure balanced in the closed position by virtue that shut-off of the faucet is effected at the inlet ports, and is biased axially in the open position by virtue that the opposed pressure-effective areas of the piston are unequal. These opposed areas of the piston differ by an amount corresponding to the cross sectional area of the control stem, and the diameter of the stem is limited to a maximum of 6 mms. to correspondingly limit the force biasing the piston axially. Thus, the combined frictional drag required to prevent the piston shifting axially under the influence of line pressure can be of an order which is compatible with operation of the faucet by a conventional push-pull and rotatable knob, that is an actuating member having no mechanical advantage, as well as by an actuating member which provides a mechanical advantage, e.g. a lever. The arrangement also facilitates the placing of an outlet port or ports in the valve chamber in a variety of alternative positions, which assists in simplifying the construction of a range of faucets according to the invention, e.g. bath faucets, kitchen faucets, and the like.

10 Claims, 4 Drawing Figures

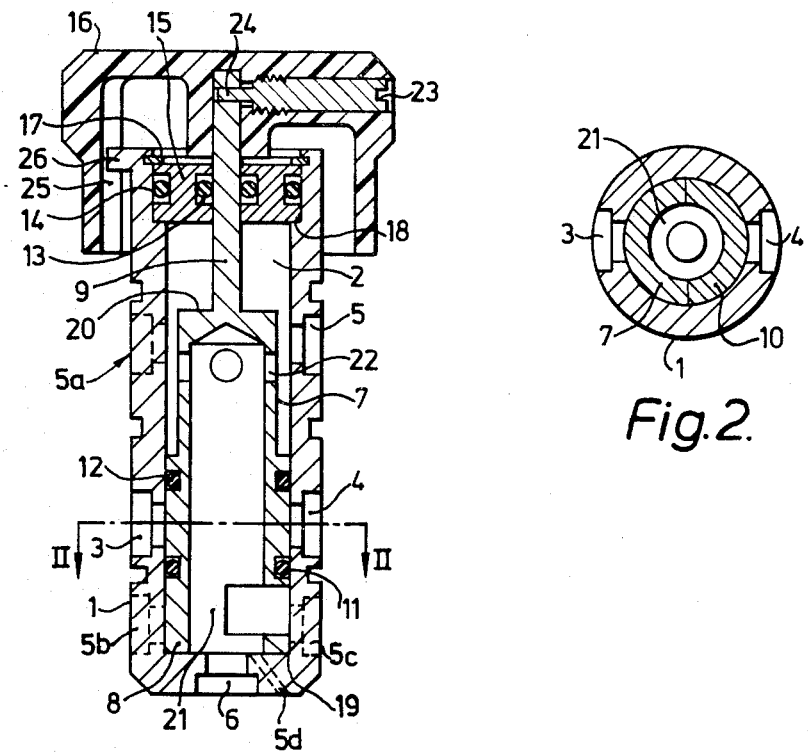
Fig.1.
Fig.2.
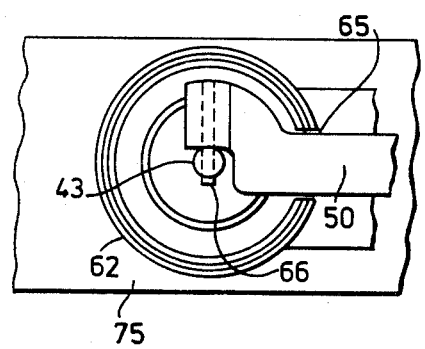
Fig.4.

MIXING FAUCET

This invention relates to a hot and cold water mixing faucet, generally for use in kitchens and bathrooms, of the kind wherein a valve means is rotated and reciprocated by a single actuating member, for example a knob or a lever, so as to control the temperature and the volume of the water discharged. Such mixing faucets will be referred to hereinafter as "faucets of the kind described".

Prior to the introduction of pressure-balanced faucets, all faucets of the kind described were unbalanced by the water pressure in both the open and closed positions of the faucet, and because the force needed to open such faucets is high, they were invariably operated by a lever having a high mechanical advantage. Such unbalanced faucets generally employ an adjustable gland packing which is tightened to prevent the valve means from shifting axially inadvertently from an intermediate open position, and the valve means is supported by a stop in the closed position. High friction is generated on adjustment of the gland packing (particularly break-out friction) so that when this is added to the forces arising due to the water pressure it is quite obvious that such constructions are not suitable for actuation by a push-pull knob. The pressure and friction forces obtaining in pressure unbalanced faucets of the known kind referred to above are examined later in this specification and are compared with the corresponding forces obtaining in a faucet according to this invention, but it can be said here that it was impossible to fit a knob for actuating the valve means mainly because such unbalanced faucets were unbalanced in the closed position and not because they were unbalanced in both the open and closed positions.

It is now the modern convention to provide, for actuating a faucet of the kind described, a push-pull and rotatable knob on a lavatory basin or bidet faucet, a lever on a kitchen faucet, and optionally either a knob or a lever on a bath or bath/shower faucet. There is no logical reason for adopting this convention, but the reason is probably that knob-operated faucets are aesthetically more pleasing and present less of a hazard to the user of a lavatory basin or bidet, whereas a lever-operated faucet is more easily operated.

Manufacturers usually provide a range of faucets, e.g. faucets for use on lavatory basins, baths, bidets, showers and sinks, and to be commercially viable it is necessary that as many parts as possible should be common to all the faucets in the range. This has led most manufacturers to discard the unbalanced type of faucet and use balanced faucets in the whole range, whether they be knob-operated or lever-operated faucets.

Pressure-balanced faucets of the kind described are, however, generally more expensive to produce than were their unbalanced predecessors, mainly because to obtain a pressure balance it is necessary to employ means for venting to atmosphere the chamber in which the valve means moves, or to provide a counter-balancing chamber, features which are not necessary in unbalanced faucets of the kind described.

Another problem facing manufacturers who make a range of faucets is that faucets for different purposes require the water discharge point or points to be in different positions. This is usually done by providing a valve chamber having a single outlet which leads to the required discharge point or points via passages in the valve body lying externally of the valve chamber, the position of said single outlet usually being dictated by the valve mechanism per se. It would be more convenient, and therefore less expensive, if a faucet of the kind described could be designed in such a way that the valve chamber could be provided, optionally, with a side outlet (for example to suit a faucet for use on a lavatory basin or bidet), or a bottom outlet (for example to suit a wall-mounted bath faucet or a bath/shower faucet), or with both side and bottom outlets (for example to suit a kitchen faucet equipped with a conventional trigger-operated rinsing spray device).

The present invention aims to provide a faucet of the kind described which solves the various difficulties and problems discussed above.

According to the invention, a mixing faucet comprising an housing having an integral cylindrical valve chamber therein with a plurality of laterally disposed inlets for the introduction of hot and cold water and one or more outlets for the discharge of water to atmosphere, sealing means for closing the faucet, valve means arranged for rotation and reciprocation relative to said valve chamber and having passage means adapted to be moved selectively into and out of register with one or more of said inlets so as to control the temperature and the volume of said water discharge, said valve means comprising a piston provided with a stem, said piston being movable axially by the stem between open and closed positions of the faucet in all angular positions of the valve means about its axis of rotation, said stem projecting from one end of said valve chamber for connection to an actuating member, and said piston having opposed transverse surfaces subject to water pressure which are isolated from said inlets by the sealing means in the closed position of the faucet, and a stem seal disposed around said stem for sealing said stem with respect to atmosphere, is characterised in that said transverse surfaces of the piston respectively present opposed pressure effective areas which are unequal by the amount corresponding to the pressure effective area of said stem seal, and in that said sealing means for closing the faucet is adapted to sever all communication between said inlets and said passage means and transverse surfaces when said valve means is moved axially to a closed position, whereby said valve means is substantially pressure-balanced in said closed position thereof and is biased axially by water pressure in all open positions thereof in the direction of said actuating means, the arrangement being such that in faucets requiring only one said outlet it may be positioned either in the sidewall of the valve chamber or in the end thereof lying remote from said actuating member, and that in faucets requiring two said outlets they may be positioned, respectively, in the sidewall of the valve chamber and in the end thereof lying remote from said actuating member, or both may be positioned in the side-wall of the valve chamber or in the end thereof lying remote from said actuating member.

In a preferred embodiment of a faucet according to the invention, a portion of said stem moves in said stem seal as the valve means is moved axially, and advantageously this portion of the stem has a diameter of from 4 to 6 mm, and prefereably a diameter not exceeding 4.5 mm. By giving said stem portion such a small diameter, the nett force tending to shift the valve means involuntarily in the axial direction will be correspondingly small and normally insufficient to overcome the break-out friction. For example, assuming that when the faucet is fully open the running water pressure at the inlets is 3 atmospheres, the unbalance force acting on the valve means when said stem portion has a diameter of 4.5 mm will be approximately 0.47 kg. By comparison, in the previously known unbalanced faucets of the kind described which are discussed above, it was common practice to employ a stem of about 8 mm diameter for moving the valve means, and this resulted in an unbalance force on the valve means, in the fully open position of the latter, of about 1.5 kg. Furthermore, the static water pressure (i.e. the pressure with the faucet closed) in a water system can be as high as 10 atmospheres, in which case the unbalance force in the previously known faucet would be of the order of 15 kg, and this force needs to be overcome to open the faucet. In a faucet according to this invention no such force can exist, because the valve means is balanced in the closed position of the faucet.

It has been found that by giving said stem portion a diameter in the range specified above, it is possible to use a seal of self-energising nature for said stem seal instead of a conventional adjustable gland packing. This relieves the manufacturer, and user, of the faucet from having to adjust a gland packing (between sensitive limits in the case of a knob-operated faucet) and also simplifies the construction of the faucet. It should, however, be observed that the employment of an adjustable gland packing is not ruled out in a faucet according to the invention, but that a seal of self-energising nature is preferred. In this specification the term "seal of a self-energising nature" means a seal which is capable of sealing a surface under the influence of its own resilience and the pressure of the water to which it is subjected, without it being necessary to apply an extraneous mechanical force to the seal. A common example of a seal of self-energising nature is an O-ring.

Since, in a faucet according to the invention, the sealing means for closing the faucet is adapted to sever all communication between said inlets and said passage means and transverse surfaces when the valve means is moved axially to a closed position, there is no need to seal the outlet or outlets of the faucet in the closed position thereof. This, of course, considerably simplifies manufacture of the faucet.

The valve chamber of a faucet in accordance with the invention may be manufactured with a single outlet or a plurality of outlets positioned as desired in the sidewall of the valve chamber and/or in the end of the valve chamber remote from said actuating means. Thus the same valve chamber may be employed, as desired, in a faucet having a single side outlet (such as is conventional in faucets designed for mounting on a sink, lavatory basin or bidet), or in a faucet having a single bottom outlet (such as is conventional in faucets designed for mounting on a wall above a bath — known in the trade as "exposed wall mounted valves"), or in a faucet having two side outlets respectively for bath and shower (known in the trade as "recessed wall mounted valves"), or in a faucet having a side outlet and a bottom outlet adapted for connection to a remote spout (such as is sometimes provided on a lavatory basin or sink). This facility of being able to position an outlet or outlets almost anywhere in the valve chamber simplifies the faucet and contributes substantially to a reduction in manufacturing costs when comparisons are made with a faucet not having a facility.

The invention will now be described, by way of example only, with reference to the accompanying drawings, in which:

FIG. 1 is a longitudinal sectional view through part of a first embodiment of a single handle mixing faucet according to the invention, FIG. 2 is a sectional view on the line II—II in FIG. 1, FIG. 3 is a longitudinal sectional view through part of a second embodiment of a single handle mixing faucet similar to that shown in FIGS. 1 and 2 but employing a lever as the actuating member, and FIG. 4 is a top view of FIG. 3 with part of the headwork of the faucet removed for clarity.

FIGS. 1 and 2 illustrate a first embodiment of the invention comprising a valve body 1 having a cylindrical bore 2 therein with laterally disposed, diametrically aligned inlet ports 3, 4 respectively for hot and cold water. The bore 2 is also provided with a laterally disposed outlet 5, and an axially directed outlet 6 which are disposed at opposite sides of the inlets 3, 4. In another arrangement two outlets may be provided above the inlets 3, 4, namely the outlet 5 and the outlet 5a shown in chain dot outline. In yet other arrangements the two outlets may be provided below the inlets 3, 4, for example any two outlets chosen from the outlets 6, 5b, 5c and 5d, the last three being shown in chain dot outlines.

Arranged for rotation and reciprocation in the cylindrical bore 2, of the valve body 1, is a valve means 7, consisting of a hollow cylindrical piston 8 and a stem 9. The piston 8 is a close sliding fit in the cylindrical bore 2, and the stem 9 extends from one end of the piston 8, co-axially, for connection with an actuating member which, in this embodiment, takes the form a push-pull and rotatable knob 16. The knob 16 has a longitudinal rib 25, which co-operates with a lug 26 formed in the valve body 1, to limit the angular movement of the valve means. It should be observed that the stem 9 is considerably smaller in diameter than the cylindrical bore 2.

The piston 8 is proved with an arcuate slot 10, which opens into the hollow interior 21 of the piston and co-operates with either or both of the inlets 3, 4 so as to select or mix the incoming hot and cold water on rotation of the valve means 7, and to control the volume thereof on axial movement of the valve means 7. Thus when the knob 16 is pulled upwards water can flow through the slot 10 to the upper outlet 5 (or outlets 5, 5a) via the interior 21 of the piston 8 and the holes 22, and to the outlet 6 (or outlets 5b – 5d) via the open lower end of the interior of the piston 8. The slot 10, the hollow interior 21 of the piston, the holes 22 and the open lower end of the interior 21 of the piston together constitute the aforesaid passage means of the faucet.

It should be observed that said passage means 10, 21, 22 of the hollow piston 8 is at all times in full communication with the outlets 5, 6 (and 5a – 5d) and the respective opposed transverse end surfaces 19, 20 of the piston.

A pair of axially spaced, co-axially disposed annular seal or "O" rings 11, 12 carried, respectively, in annular grooves formed in the piston 8, co-operate slidingly with the surface of the cylindrical bore 2. In the closed position of the valve means 7, the "O" rings 11, 12 are disposed, respectively, above and below the inlets 3, 4, and on movement of the valve means 7, upwards from the closed position shown in the drawings, "O" ring 11 moves across the inlet ports 3, 4 (or partially across, depending on the degree of axial movement) to open the faucet.

Further annular seals or "O" rings 13, 14 disposed, respectively, around the stem 9, and around a seal holder member 15, prevent water leaking along the stem 9, and from the top end of the valve body 1, to atmosphere. The stem 9 extend co-axially through the seal holder member 15 for connection to the knob 16, and a screw 23 extending laterally in the knob 16 engages a transverse hole 24 in the top end of the stem 9. a circlip 17, secured into the top end of the valve body 1, overlies the seal holder member 15 to hold the latter in position against a complementary ledge or shoulder 18, in the valve body 1.

The valve body 1 may be generally tubular in form as shown, so as to be capable of being inserted into faucet casings of various configurations having complementary inlet and outlet passages, or it may be the faucet proper.

The valve means 7 is substantially pressure-balanced when in the closed position shown in the drawings by virtue that, in this position, the "O" rings 11, 12 are disposed, respectively, above and below the inlets 3, 4, whereby line water pressure is excluded from the interior 21 of the piston 8, and also therefore from the transverse end surface 19, 20, of the piston 8. In this closed position the pressure acting on the transverse surface 19, 20 will be substantially that of the atmosphere, or perhaps slightly above that of the atmosphere in cases where the discharge point is above the faucet proper (e.g. as in a shower valve). In any event it will be negligible.

In the open position, the valve means 7 is pressure unbalanced because line water pressure can then act on the opposed transverse end surfaces 19, 20 of the piston 8, and because the areas of these opposed surfaces 19, 20 are unequal, this action produces a nett force which tends to move the piston axially; in this case upwardly.

The difference between the areas of the opposed transverse end surfaces 19, 20, is equivalent to the cross-sectional area of the stem 9, or more properly that part of the stem 9 which moves in the annular seal 13. Thus if the stem 9 is kept small in diameter, the nett force tending to move the valve means 7 will be correspondingly small, and also, in any intermediate open position of the valve means 7, the flow of water, and therefore the said nett force will be less than that obtaining when the valve means 7 is in the fully open position. This latter condition arises because, in any intermediate open position, the inlets 3, 4 are throttled by the piston 8, whereas the outlets 5, 6 (and 5a - 5d) are in no way throttled. The back pressure acting on the end surfaces 19, 20 will vary directly as the rate of flow, and thus the said net force will vary accordingly.

Provided therefore, the nett force tending to move the valve means 7 axially, involuntarily, from any open position into which it is placed by an operator, is insufficient to overcome the break-out friction of the seals 11, 12, and 13, then the valve means 7 will stay in said any open position.

By keeping the diameter of the stem 9 small (typically of the order of 4 to 6 millimeters) it has been found that such an arrangement 15 is entirely feasible. In particular the level of break-out friction required to hold the valve means from moving is sufficiently low to enable a gland seal 13 of self-energising nature to be used, in place of the conventional adjustable gland packing. This simplifies the construction of the faucet, relieves the user from having to make periodic adjustments, and gives a level of friction which is entirely compatible with easy and sensitive operation of the faucet by a push-pull and rotatable knob. It is of course to be understood that the less convenient, conventional, adjustable type of gland packing could be used in place of the seal 13 of self-energising nature shown.

FIGS. 3 and 4 show a second embodiment of the invention, designed for fixing to a kitchen sink. The faucet comprises a valve body 31, which may be machined from bar material, having a chamber 32 therein consisting of three bores 33, 34 and 35, of different diameters. Diametrically aligned inlet ports 37, 38, respectively, for hot and cold water open into bore 35 of the chamber 32, and the valve body 31 is further provided with a top outlet 39 leading from bore 34 and a bottom outlet 40 leading from bore 35.

Arranged for rotation and reciprocation in the chamber 32 is a valve means 41 consisting of a hollow piston 42, and a stem 43. The piston 42 is made a close sliding fit in bore 35 of the chamber 32, and as in the previous embodiment the stem 43 is made considerably smaller in diameter than bore 35.

The piston 42 is provided with two "O" rings 44, 45 which straddle the inlet ports 36, 37 when the piston 42 is in the closed position shown in the drawings. An arcuate slot 46, formed in the piston 42, opens into the hollow interior 47 of the piston, and slot 46 may be brought into various degrees of communication with either or both the inlet ports 36, 37 so as to select or mix the hot and cold water on rotation of the piston 42, and to control the volume thereof on axial movement of the piston 42.

The faucet is shown in the closed position, and as in the previously described embodiment, the interior 47 of the piston 41 is in communication with the transverse end surface 48, via the open lower end of the piston, with the transverse end surface 49, via holes 83 through the piston wall, and with the two outlets 39, 40. The valve is opened by rocking a lever 50 downwardly, whereupon "O" ring 44 moves across the inlets 37, 38 and slot 41 moves into register with said inlets to allow water to flow, via the interior 47 of the piston, either to outlet 39, or to outlet 40, depending on operation of a conventional, trigger operated spray device (not shown) which may be connected to the screw portion 51 of the valve body 31. Alternatively outlet 40 may be blanked off or dispensed with.

The stem 43 extends co-axially through a seal holder member 52, having inner and outer "O" rings 53, 54 disposed co-axially, respectively, around the stem 43 and between the bore 33 and the seal holder member 52. These two "O" rings 53, 54 prevent water leaking to atmosphere from the top end of the chamber 32. The holder member 52 is held axially in position against a shoulder 56 defining the intersection of the two bores 33, 34 by a lever and lever support assembly 57.

The lever and lever support assembly 57 consists of a mounting member or collar 58, a rotatable two-piece escutcheon cap 59, a trim member 60, and the lever 50. The collar 58 is screwed to the top end of the valve body 31 and clamps the seal holder member 52 against the shoulder 56. Collar 58 is provided with a male spigot 61 on which the escutcheon cap 59 is rotatably mounted to surround the stem 43 of the valve means 41. The cap 59 consists of a lower part 62, which is held axially in position by a circlip 63, and an upper part 64, the two parts 62, 64 being screwed together to facilitate the assembly of the lever 50. The lever 50 projects through a slot 65 formed at the interface of the two parts 62, 64 of the cap 59, and is shaped at its outer end to provide a handle for operating the faucet. At its inner end, the lever 50 is fitted with a pin 66 which engages with a complementary transverse hole formed in the stem 43 of the valve means 41. Rocking movement of the lever 50 in the slot 65 causes the valve means 41 to reciprocate and angular movement of the lever 50 about the axis of the chamber 32 causes the valve means 41 and the cap 59 to rotate in unison.

Because the stem 43 is small in diameter, the pin 66 and the complementary hole in the stem will be correspondingly small, and to eliminate the possibility of the pin 66 being sheared by an operator, the lever 50 is arranged so that at the limits of its rocking movement it abuts, respectively, the top face 67 of the spigot 61, and a face 68 provided in the upper part 64 of the cap 59, whereby the axial travel of the valve means 41 is limited by the lever 50, and any axial load resulting from excessive effort by an operator is taken on the lever 50 and not on the pin 66.

Supply pipes 69, 70 are brazed directly, respectively, into the inlet ports 36, 37 in the valve body 31, and extend laterally therefrom, and are bent downwards to facilitate connection to the respective service pipes (not shown). The valve body 31 is provided, at its lower end, with a screw-threaded extension 71, serving as a means for fixing the unit to a kitchen sink. A baseplate 72 and a gasket 73 are mounted on the screw-threaded extension 71, and the baseplate 72 is provided with two depending lugs 74 (only one of which is shown) which on installation respectively locate in two holes in a kitchen sink (shown in chain dot outline). A trim member 75 is provided to cover the supply pipes 69, 70, the baseplate 72, and the gasket 73, and a backnut 76 and washer 77 are provided on the screw-threaded extension 71 for clamping the faucet in position on said sink.

A conventional swing spout 78 consisting of a tubular member 79, and a pipe 80, is mounted rotatably on the valve body 31, members 79 and 80 being brazed together. Disposed between the valve body 31 and the tubular member 79 are a pair of "O" rings 81, 82 which prevent water leaking from the ends of the tubular member 79 to atmosphere, while allowing the swing spout 78 to be moved into any angular position required by a user. Communication between the interior 47 of the piston 41 and the pipe 80 is via the holes 83, the top outlet 39, an annulus 84 formed in the valve body 31 and a hole 85 formed in the tubular member 79 of the swing spout 78.

What is claimed is:

1. An hydraulically unbalanced type of hot and cold water mixing and flow control faucet dimensioned for use in a kitchen or bathroom, said faucet comprising:
   a. a housing structure including a valve chamber having a cylindrical bore of a specific diameter;
   b. inlet means in said housing structure connectible to hot and cold water supplies of said kitchen or bathroom and including respective hot and cold water inlet ports opening laterally into said bore;
   c. outlet means in said housing structure for discharging said supplies to atmosphere and including an outlet port opening into said valve chamber at a point spaced axially from said inlet ports;
   d. valve means movable relative to said housing structure comprising a one-piece cylindrical piston and a coaxial stem, the piston being disposed in said bore and the stem passing through one end of said valve chamber for connection to an actuating member, said piston and stem being movable as a unit in said bore by said actuating member in a rotary mode to control the relative degree of opening of said inlet ports and in an axial mode to control the absolute degree of opening thereof, and being movable in at least one of said modes between two spaced limit positions, said faucet including stop means provided on the actuating member and said housing structure to define at least one of said two spaced limit positions, said stop means preventing excessive operator-induced stresses occurring in said cylindrical stem portion when said valve means is in said at least one limit position, and said valve means being axially movable from open position to closed position irrespective of its angular orientation in said bore;
   e. first sealing means surrounding said stem and providing a seal between said housing structure and said stem to prevent water leaking along the stem from said valve chamber to atmosphere, said first sealing means being of a self-energising nature and said stem having a cylindrical portion of smaller diameter than said bore which moves in said first sealing means as said valve means is moved axially;
   f. opposed transverse surfaces of different areas on said valve means which always remain in communication with said outlet means and which, whenever the valve means is moved axailly from said closed position, are subject to the line water pressure of at least one of said water supplies, th difference in areas of said opposed surfaces being equal to the cross-sectional area of said cylindrical stem portion, whereby whenever said valve means is moved axailly from said closed position to an open position it becomes biased axially by a nett force equal to the product of the cross-sectional area of said cylindrical stem portion and the water pressure then obtaining in said valve chamber, the diameter of said cylindrical stem portion being at most 6 millimeters in order to limit said nett force and so limit the frictional drag it is necessary to have between said valve means and said housing structure to prevent inadvertent axial shifting of said valve means when it is in a position intermediate said open and closed limit positions; and
   g. drip-tight second sealing means isolating said inlet means from said opposed transverse surfaces and from said first sealing means whenever said valve means is in said closed position, whereby when said valve means is in said closed position said piston is relieved of said nett force and said first sealing means is relieved of the pressure of said water supplies.

2. The mixing and flow control faucet of claim 1, wherein said outlet means comprises a second outlet port opening into said valve chamber.

3. The mixing and control faucet of claim 2, wherein said two outlet ports are spaced apart axially of said chamber, and said inlet ports are disposed between said two outlet ports.

4. The mixing and control faucet of claim 2, wherein said two outlet ports are disposed between said inlet ports and said one end of said valve chamber.

5. The mixing and control faucet of claim 2, wherein said two inlet ports are disposed between said two outlet ports and said one end of said valve chamber.

6. The mixing and control faucet of claim 1, wherein said second sealing means comprises a pair of axially-spaced annular sealing members coaxially disposed between said piston and said bore of the valve chamber, said sealing members in said closed position of the valve means lying, respectively, at axially opposite sides of said inlet ports, and one of said sealing members moving across said inlet ports as said piston is moved axially between said open and closed limit positions of said valve means.

7. The mixing and control faucet of claim 1, wherein said first sealing means is an "O" ring.

8. The mixing and control faucet of claim 1, wherein the diameter of said cylindrical stem portion is at least 4 millimeters.

9. The mixing and control faucet of claim 1, including stop means on said housing structure and on said actuating member for defining at least one of said limit positions, said stop means incorporating means for relieving said stem of stress in the event that, after said valve means has been moved axially to said at least one position by movement of the actuating member in the complementary direction, further effort is applied to said actuating member in said complementary direction.

10. The mixing and control faucet of claim 1, including stop means on said housing structure and on the actuating member for limiting rotation of said valve means to between two angularly spaced limit positions, said stop means incorporating means for relieving said stem of stress in the event that, after said valve means has been rotated to one of said angularly spaced limit positions by movement of said actuating member in the complementary direction, further effort is applied to said actuating member in said complementary direction.

* * * * *